(12) United States Patent
Nezami et al.

(10) Patent No.: US 12,320,388 B2
(45) Date of Patent: Jun. 3, 2025

(54) BALL BEARING

(71) Applicant: Hanon Systems, Daejeon (KR)

(72) Inventors: Iman Nezami, Remscheid (DE);
Thomas Klotten, Cologne (DE)

(73) Assignee: HANON SYSTEMS, Daejeon (KR)

( * ) Notice: Subject to any disclaimer, the term of this patent is extended or adjusted under 35 U.S.C. 154(b) by 31 days.

(21) Appl. No.: 18/548,956

(22) PCT Filed: Jan. 27, 2022

(86) PCT No.: PCT/KR2022/001428
§ 371 (c)(1),
(2) Date: Sep. 5, 2023

(87) PCT Pub. No.: WO2022/186483
PCT Pub. Date: Sep. 9, 2022

(65) Prior Publication Data
US 2024/0151268 A1    May 9, 2024

(30) Foreign Application Priority Data

Mar. 2, 2021   (DE) .................... 10 2021 104 966.0
Jan. 13, 2022  (DE) .................... 10 2022 100 737.5

(51) Int. Cl.
*F16C 19/06*    (2006.01)
*F16C 33/38*    (2006.01)

(52) U.S. Cl.
CPC .......... *F16C 33/3831* (2013.01); *F16C 19/06* (2013.01); *F16C 2208/36* (2013.01); *F16C 2208/40* (2013.01); *F16C 2208/42* (2013.01); *F16C 2208/90* (2013.01); *F16C 2360/00* (2013.01)

(58) Field of Classification Search
CPC .. F16C 19/06; F16C 33/3806; F16C 33/3831; F16C 33/41; F16C 2208/36; F16C 2208/40; F16C 2208/42; F16C 2208/90; F16C 2360/00
See application file for complete search history.

(56) References Cited

U.S. PATENT DOCUMENTS 3,554,621 A  *  1/1971  McAllister .......... F16C 33/3831
                                                    384/527
8,303,192 B2 * 11/2012  Yamada ............. F16C 33/3875
                                                    384/576
2008/0019623 A1  1/2008  Otsuka

FOREIGN PATENT DOCUMENTS

| DE | 3300653 A1  | 7/1984  |
| DE | 3510467 A1  | 10/1985 |
| DE | 3724046 A1  | 1/1988  |
| DE | 19951387 A1 | 5/2001  |

(Continued)

OTHER PUBLICATIONS

DE102008027764A1_Description.*

(Continued)

*Primary Examiner* — Phillip A Johnson
(74) *Attorney, Agent, or Firm* — Shumaker, Loop & Kendrick, LLP; James D. Miller

(57) ABSTRACT

A ball bearing for the scroll of a scroll compressor, having an outer race, an inner race and a plurality of balls disposed therebetween, characterized in that the balls are held and guided in a ball bearing cage, wherein the ball bearing cage is formed as an externally guided plastic cage with a reinforcing structure made of metal as a hybrid cage.

6 Claims, 2 Drawing Sheets

(56) References Cited

FOREIGN PATENT DOCUMENTS

| | | | | |
|---|---|---|---|---|
| DE | 202004021277 U1 | | 5/2007 | |
| DE | 102008027764 A1 | * | 12/2009 | ............... F16C 33/41 |
| DE | 102010017660 A1 | | 1/2012 | |
| DE | 102013221682 A1 | | 4/2015 | |
| EP | 2932118 B1 | | 10/2019 | |
| JP | H08145061 A | | 6/1996 | |
| JP | H0979265 A | | 3/1997 | |
| JP | 2001140870 A | * | 5/2001 | ............ F16C 19/163 |
| JP | 2005003195 A | | 1/2005 | |
| JP | 2007298164 A | * | 11/2007 | .......... F16C 33/3831 |
| JP | 2008111456 A | * | 5/2008 | .......... F16C 33/3831 |
| JP | 2008128296 A | | 6/2008 | |
| JP | 2010001971 A | | 1/2010 | |
| JP | 2014181735 A | * | 9/2014 | .......... F16C 33/3806 |

OTHER PUBLICATIONS

JP2001140870A_Description.*
JP2007298164A_Description.*
JP2014181735A_Description.*

* cited by examiner

BALL BEARING

CROSS REFERENCE TO RELATED PATENT APPLICATIONS

This is a U.S. national phase patent application of PCT/KR2022/001428 filed Jan. 27, 2022 which claims the benefit of and priority to German Patent Application No. 10 2022 100 737.5 filed on Jan. 13, 2022 and German Patent Application No. 10 2021 104 966.0 filed on Mar. 2, 2021, the entire contents of each of which are incorporated herein by reference.

TECHNICAL FIELD

The invention relates to a ball bearing, in particular for the orbiting scroll of a scroll compressor. The ball bearing has a ball bearing cage, which is configured as an externally guided plastic cage.

BACKGROUND ART

Ball bearings with ball bearing cages sometimes have to meet the highest requirements in terms of tolerance, smooth running, roundness and surface quality. Ball bearing cages are employed in various fields of application, for example for bearing the orbiting scroll of a scroll compressor.

In the prior art, ball bearing cages are made of plastics such as polyamide-imide, polyether ether ketone or phenolic resin with fine-meshed cotton fabric. Alternatively, ball bearing cages are also made of steel or non-ferrous metals.

In addition to outboard- and inboard-guided ball bearing cages, riveted ball bearing cages or ball bearing cages with a wide variety of internal and external contours are also known.

As an example, EP 2 932 118 B1 teaches a two-part ball bearing cage with a plurality of prongs forming holding claws.

DE 35 10 467 A1 discloses a ball bearing cage for radial ball bearings, consisting of an annular body made of a resilient material, which has pockets for receiving balls in a snap fit and guide pins for directing the balls into the pockets. A retaining ring on the guide pins limits deformation of the annular body. This prevents the annular body from being ejected under the influence of contact forces occurring between the balls and cage during operation of the bearing.

DE 199 51 387 A1 teaches a ball bearing cage made of an elastically deformable plastic material with spherical ball seat surfaces arranged in pockets. The bearing balls are seated in a pocket adapted to the change in length with increased pocket play.

In certain fields of application, special requirements are placed on the ball bearings and the ball bearing cages. The use of ball bearings for the orbiting scroll of a scroll compressor is such an application with a special requirement profile for the ball bearing and the ball bearing cage employed.

Due to the orbital motion of the scroll in the scroll compressor, the ball bearing is additionally subjected to a centrifugal force. This force depends on the mass, the orbital radius and the rotational speed of the scroll.

In model applications with use of the scroll compressors in refrigerant circuits in motor vehicles, increased mass flows of the refrigerant in the circuit are required to achieve sufficient cooling of the various components in the vehicles as well as the passenger compartment itself. Increased mass flow of the refrigerant in the refrigerant circuit results in higher loads and a higher speed of the scroll compressor employed. Both components also increase the centrifugal force for the ball bearing.

Ball-guided metal cages according to prior-art designs exceed their load limits, and experience has shown that they fail relatively often.

Plastic cages guided externally in ball bearings are generally more suitable than ball-guided metal cages, but they have a problem with the strength in the thinnest area of the ball bearing cages. This thinnest area is also referred to as a bridge, which is entailed by the balls. Limited by the inner and outer races of the ball bearing, the space is not large enough to create an appropriately strong plastic cage.

The object of the invention is to provide a ball bearing that can withstand the increased mechanical requirements caused by centrifugal forces in the ball bearing. As such, the aim is to increase the service life of the ball bearing without changing the dimensions of the ball bearing through extensive material reinforcement.

SUMMARY

The object is achieved by a subject matter as shown and described herein.

More specifically, the object of the invention is achieved by a ball bearing for the scroll of a scroll compressor, having an outer race, an inner race and a plurality of balls disposed therebetween in that the balls are held and guided in a ball bearing cage. The ball bearing cage is formed as an externally guided plastic cage with a reinforcing structure made of metal as a hybrid cage. The term hybrid cage is understood to mean a ball bearing cage which is constructed from different materials which together form a hybrid cage by being firmly bonded to each other.

The ball bearing cage is formed as a one-sided cage of a snap cage type, which receives the balls laterally in recesses of the plastic cage on one side of the ball bearing. During assembly, the balls are received by the plastic cage in a snap-like action, and the suspension area of the plastic cage surrounds the balls towards the opposite second side of the ball bearing. In the plastic cage, the metal reinforcing structures are disposed which give the ball bearing cage its mechanical strength and resistance.

For the purposes of the invention, a reinforcing structure should be understood to mean a ring-like element which is made of metal and which interacts with the plastic cage and mechanically reinforces the latter as a result of the connection of the metal to the plastic cage. In particular, this reinforces the mechanical load capacity with regard to the acting centrifugal forces.

Thus, the ball bearing cage is formed from the plastic cage with the areas for receiving the balls, limited by the suspension towards the second side.

Advantageously, the reinforcing structure is disposed inside the plastic cage. As such, the plastic material receives and surrounds the reinforcing structure completely.

Alternatively, the reinforcing structure is disposed at least partially outside the plastic cage and is firmly connected to the ball bearing cage mechanically such that reinforcement of the entire ball bearing cage is accomplished by the external reinforcing structure.

Preferably, the reinforcing structure is designed as an insert in the ball bearing cage, with the web area of the plastic cage receiving special mechanical reinforcement.

The web area of the ball bearing cage is the area in which material thickness is most weakened by the recesses for the balls, i.e., the thinnest area towards the side.

Particularly advantageously, the reinforcing structure is formed from circumferentially shaped rings or wires. As such, as a reinforcing structure, the rings or wires are disposed inside or outside the ball bearing cage. When disposed inside or partially outside the ball bearing cage, the rings or wires are made and firmly connected to the plastic material of the ball bearing cage by overmolding or partially overmolding the reinforcing structure with the plastic material.

Advantageously, the reinforcing structure is formed as a circumferentially shaped ring with an I-profile. The I-profile is designed in the cross-section between the inner and outer races of the ball bearing and is disposed in the radial direction. The I-profile forms a flat ring, wherein the width of the ring in the axial direction and the height in the radial direction are aligned with respect to the ball bearing.

Alternatively, the reinforcing structure is formed as a circumferentially shaped ring with an H-profile, wherein one lateral flank of the H-profile is inside the plastic material of the ball bearing cage and the other lateral flank is outside the plastic material of the ball bearing cage. The lateral flanks of the H-profile are connected by the central web, which creates a mechanical connection of the flanks and thus improves the effect of the profile by means of an overmolded area and a non-overmolded area.

Alternatively, the reinforcing structure is formed as a circumferentially shaped ring with an X-profile, wherein one side is, in turn, overmolded with two webs of plastic material disposed at an angle to each other, wherein both sides or wherein the entire X-profile is embedded in the plastic material of the ball bearing cage.

An advantageous alternative embodiment of the invention is that the reinforcing structure is formed as a circumferentially shaped ring with an L-profile.

More preferably, the reinforcing structure is designed as a circumferentially shaped ring with an O-profile. O-profiles are also called O-rings. These can be formed as either a solid profile or as hollow profiles.

Furthermore, various cross-sections can be realized for reinforcing structures. The shape can be specifically adapted to the particular application.

The plastic ball bearing cages are preferably made of polyamide-imide, polyether ether ketone or phenolic resin with fine-meshed cotton fabric.

In order to achieve the required strength despite the limited space for the ball bearing cage, a hybrid solution was developed in line with the concept. A metal reinforcement in the bridge area around the balls absorbs the stress. This reinforcement can be inside or outside the main plastic body of the ball bearing cage, as long as a strong connection between the different materials is ensured. Suitable reinforcements include inserts in the web area, circumferentially shaped rings or wires, I-, L-, X- or O-shaped profiles and also webs.

The advantageous mechanical properties resulting from the hybrid ball bearing cages should be highlighted as particularly beneficial. They combine the resilience of the plastic material with the stability of the metal. The reliability of the ball bearing can be significantly increased, as the centrifugal forces can be better absorbed. This allows larger mass flows to be conveyed in the application for scroll compressors in refrigerant circuits, which has process-related advantages.

Another advantage is that by employing ball bearing cages with reinforcing structures made of metal, the installation space of the ball bearing can also be reduced. The reinforcement of the ball bearing cage achieved by the reinforcing structures results in a strength increased such that otherwise usual protruding material reinforcements can be dispensed with and the ball bearings can thus be sized narrower overall.

DESCRIPTION OF DRAWINGS

Further details, features, and advantages of embodiments of the invention will become apparent from the following description of exemplary embodiments with reference to the accompanying drawings. In the drawings.

DESCRIPTION OF AN EMBODIMENT

Figure 1:
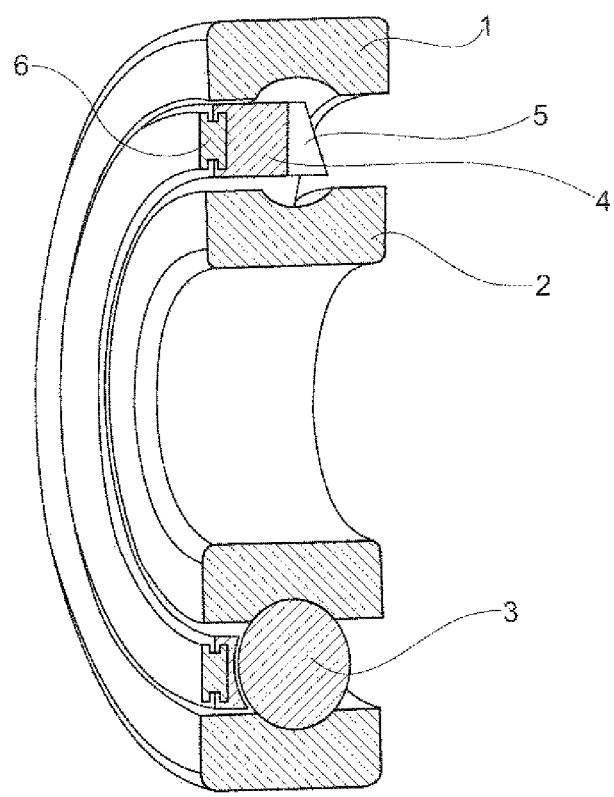
FIG. 1: shows a perspective view and cross-section of a ball bearing with a hybrid ball bearing cage and H-profile

FIG. 1 shows a sectional and perspective view of a ball bearing. The ball bearing consists of the basic elements of outer race (1) as well as the inner race (2) and balls (3) disposed therebetween. The balls (3) are held in their position by a ball bearing cage (4) and, in addition, a suspension (5) is shown for fixing the components to each other and a reinforcing structure (6) is shown as part of the ball bearing cage (4).

In the embodiment according to FIG. 1, the reinforcing structure (6) has an H-profile. The H-profile has two parallel lateral flanks or legs, which are connected to each other by a central web. The shape of the letter H is shown in the cross-section and positioned accordingly between the outer race (1) and the inner race (2). The one lateral flank is integrated into the plastic matrix of the ball bearing cage (4) and is fully received by the latter, whereas the other lateral flank of the H-profile is configured outside the plastic cage, shown as a wide ring in the illustration according to FIG. 1. Due to material thinning, the ball bearing cage (4) with its component of plastic cage is more susceptible to mechanical strain in the areas in which the ball is positioned. The reinforcing structure (6) stabilizes these areas subject to particular mechanical strain by forming the hybrid ball bearing cage. Thus, higher speeds with correspondingly higher centrifugal forces and, as a result, higher mass flows are possible in the employed scroll compressor without changing the dimensions of the ball bearing or the ball bearing cage (4).

In the exemplary embodiment according to FIG. 1, a one-sided ball bearing cage (4) is shown. The upper section through the ball bearing shows an area outside the ball (3). The plastic cage of the ball bearing cage (4) is hatched opposite to the section through the reinforcing structure (6). The area of the suspension (5) of the plastic cage encloses the ball (3) towards the open right side of the ball bearing and holds and guides it accordingly.

The lower section of the ball bearing shows the cross-section in the web area of the ball bearing cage (4). The ball (3) is shown in full cross-section. In this location, the web area has the lowest material thickness of plastic material. In these areas, the reinforcing structure (6) made of metal leads to a significant improvement in the strength and load capacity values of the ball bearing cage (4) and thus to an improvement of the entire ball bearing.

Figure 2A:
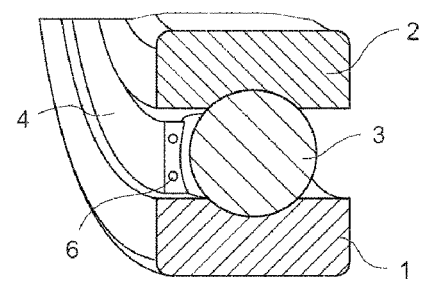
FIG. 2A: shows a detailed cross-section of a ball bearing with double O-profile as a reinforcing structure
Figure 2B:
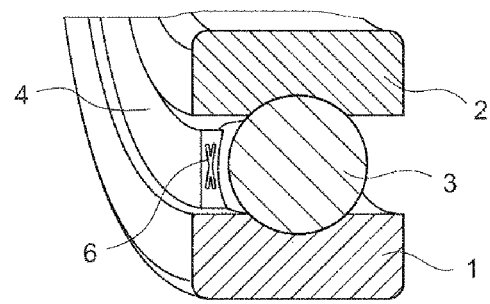
FIG. 2B: shows a reinforcing structure as an X-profile
Figure 2C:
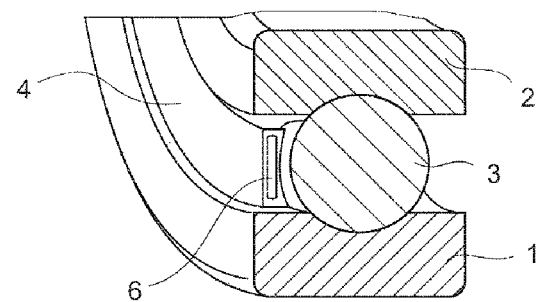
FIG. 2C: shows a reinforcing structure as an I-profile.

FIGS. 2A, 2B, and 2C each show a portion of a ball bearing with particular focus on the design of the reinforcing structure (6) inside the ball bearing cage (4).

All embodiments of FIGS. 2A, 2B, and 2C show the basic components of the ball bearing with outer race (1), inner race (2) and balls (3) disposed therebetween. The individual embodiments differ in the way the reinforcing structure (6) is designed.

FIG. 2A shows two O-profiles which are integrated in the ball bearing cage (4) in an annular manner as solid profiles in the form of wire rings. The O-rings of the reinforcing structure (6) are completely surrounded by the plastic material of the ball bearing cage (4).

FIG. 2B shows the special design feature of the reinforcing structure (6) inside the ball bearing cage (4) in the form of the X-profile. The X-profile is disposed in the cross-section between the outer race (1) and the inner race (2) and is completely surrounded by the plastic matrix of the plastic cage. This design provides particular torsional stiffness.

FIG. 2C shows an I-profile as the reinforcing structure (6), which is completely received by the plastic matrix of the plastic ball bearing cage (4). The I-profile shown is also completely surrounded by the plastic matrix of the plastic cage.

LIST OF REFERENCE NUMERALS

1 Outer race
2 Inner race
3 Ball
4 Ball bearing cage
5 Suspension
6 Reinforcing structure

The invention claimed is:

1. A ball bearing for the scroll of a scroll compressor, comprising an outer race, an inner race, and a plurality of balls disposed therebetween, wherein the balls are held and guided in a ball bearing cage, wherein the ball bearing cage is formed as an externally guided plastic cage with a reinforcing structure made of metal as a hybrid cage, wherein the reinforcing structure is formed as a circumferentially shaped ring with an H-profile, and wherein the H-profile has two parallel lateral flanks, which are connected to each other by a central web, a first one of the lateral flanks is inside the plastic cage and a second one of the lateral flanks is outside the plastic cage.

2. The ball bearing according to claim 1, wherein the reinforcing structure is an insert in the plastic cage of the ball bearing cage for reinforcing a web area.

3. The ball bearing according to claim 1, wherein the ball bearing cage is formed from polyamide-imide.

4. The ball bearing according to claim 1, wherein the ball bearing cage is formed from polyether ether ketone.

5. The ball bearing according to claim 1, wherein the ball bearing cage is formed from phenolic resin with meshed cotton fabric.

6. A ball bearing for the scroll of a scroll compressor, comprising an outer race, an inner race, and a plurality of balls disposed therebetween, wherein the balls are held and guided in a ball bearing cage, wherein the ball bearing cage is formed as an externally guided plastic cage with a reinforcing structure made of metal as a hybrid cage, wherein the reinforcing structure is formed as a circumferentially shaped ring with an X-profile, and wherein the X-profile is completely surrounded by the plastic cage.

\* \* \* \* \*